United States Patent [19]

Allen

[11] 4,277,435
[45] Jul. 7, 1981

[54] PLASTIC TUMBLER AND METHOD AND APPARATUS FOR MAKING SAME

[75] Inventor: Paul E. Allen, Newtown, Conn.

[73] Assignee: Logic Devices, Inc., Bethel, Conn.

[21] Appl. No.: 24,814

[22] Filed: Mar. 28, 1979

[51] Int. Cl.³ .............................................. B29F 1/00
[52] U.S. Cl. ................................................ 264/328.12
[58] Field of Search ........................... 264/328, 328.12

[56] References Cited

U.S. PATENT DOCUMENTS

| 2,199,144 | 4/1940 | Tegarty ...................... 264/328.12 X |
| 2,372,177 | 3/1945 | Conner ....................... 264/328.12 X |
| 3,247,550 | 4/1966 | Haines ............................. 264/328 X |
| 3,626,051 | 12/1971 | Liautaud ......................... 264/328 X |
| 3,907,952 | 9/1975 | Cleereman ...................... 264/328 X |
| 3,975,494 | 8/1976 | Tritenne ......................... 264/328 X |
| 4,091,069 | 5/1978 | Allen .................................. 264/328 |
| 4,177,238 | 12/1979 | Allen .................................. 264/328 |

FOREIGN PATENT DOCUMENTS 1288393 4/1960 France ................................ 264/328.12

Primary Examiner—Thomas P. Pavelko

[57] ABSTRACT

A tumbler is formed of injected plastic material that has different directional strengths by injecting the plastic material somewhat tangentially to cause the plastic material to move peripherally in the rim defining portion of the mold cavity in order to have the weaker directional strength also extend peripherally to thereby increase the tumbler's resistance to lengthwise splitting from the rim to the bottom and in which the mold is vented into a cooling passageway.

5 Claims, 5 Drawing Figures

U.S. Patent   Jul. 7, 1981   4,277,435
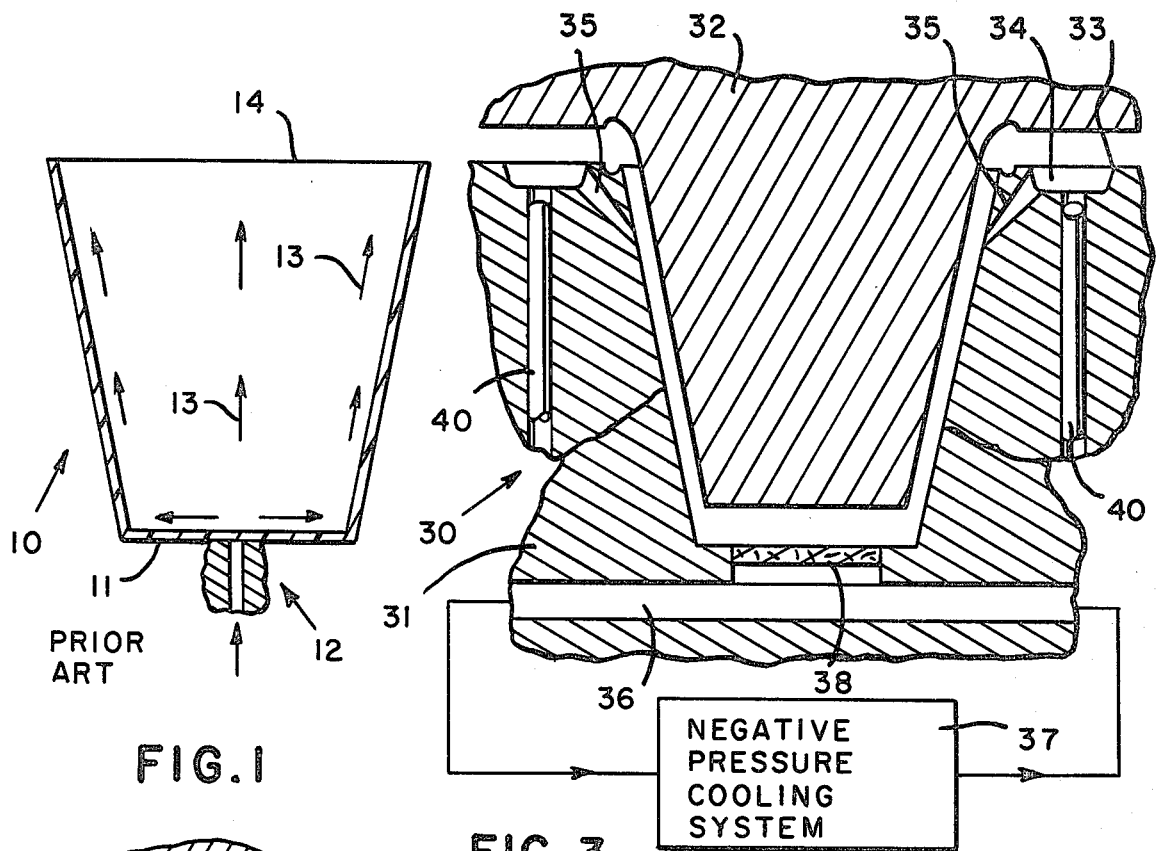
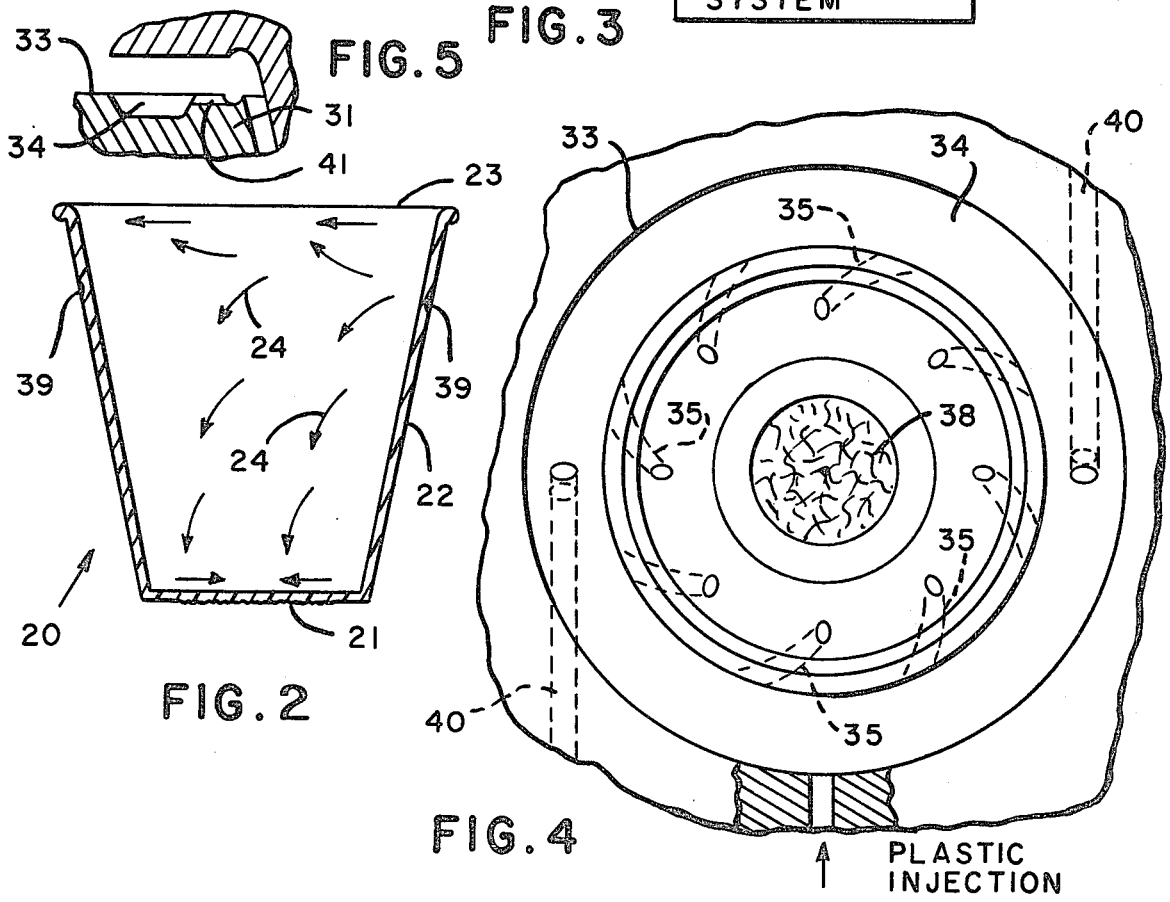
FIG. 1 PRIOR ART
FIG. 2
FIG. 3
FIG. 4
FIG. 5
NEGATIVE PRESSURE COOLING SYSTEM
PLASTIC INJECTION

PLASTIC TUMBLER AND METHOD AND APPARATUS FOR MAKING SAME

The present invention relates to an open container, such as a drink containing tumbler cup or glass, formed of injected plastic material. Heretofore such tumblers have been formed by injecting plastic material into a mold with the plastic material being forced into the mold where the middle of the bottom of the tumbler is formed. The material then moves across the bottom and up the side wall until it fills the cavity and forms the rim. One plastic material that is commonly employed is transparent polystyrene. However, this material while economical, posesses different directional strengths so that it is strongest in the direction in which it flows to fill the mold and weakest in the direction perpendicular thereto. Thus, if a compressing force is applied to opposite side walls of a heretofore known tumbler, as by squeezing the tumbler while holding it, the tumbler not unusually splits or fractures along opposite lines extended from the rim downwardly towards the bottom.

It is accordingly an object of the present invention to manufacture a plastic injected tumbler which is quite resistant to lengthwise fracturing or splitting.

Another object of the present invention is to achieve the above object with a tumbler that is similar in appearance and shape to heretofor known tumblers.

A further object of the present invention is to achieve the above objects with a method and apparatus which enables tumblers to be made at least as economically as previously and yet perhaps more economically than heretofore known tumblers.

In carrying out the present invention, a plastic injection mold is provided which consists of a stationary part and a movable part. The parts, when clamped together, define the tumbler shaped mold cavity. According to the present invention, the stationary part, defining the outside of the tumbler, is formed with a plurality of gates that are located adjacent or at the rim defining portions of the mold cavity to be evenly, circumferentially spaced thereabout. The gates are shaped to extend somewhat tangentially of the tumbler rim. The plastic material when injected is caused to flow in a path that causes the rim portion of the mold to be filled by a circular or peripheral movement of the plastic material while the side walls are filled by a decreasing swirling movement.

The portion of the stationary part defining the bottom of the tumbler is provided with a porous plug or small openings which interconnect the bottom of the mold cavity with a cooling passageway. The passageway is supplied with cooling liquid by a negative pressure cooling system thereby enabling gases in the mold cavity to be vented into the passageway during the injection of the plastic material and accordingly, not interfere with the complete filling of the mold by the plastic material.

Other features and advantages will hereinafter appear.

In the drawing

FIG. 1 is a diametrical section of a prior art plastic tumbler.

FIG. 2 is a diametrical section of a tumbler made according to the present invention.

FIG. 3 is a diagrammatic sectional representation of the mold used to make the tumbler of FIG. 2 with the mold parts being shown somewhat separated.

FIG. 4 is a view of the top of the stationary mold part.

FIG. 5 is a sectional detail of another embodiment in which the gates are positioned at the rim defining portion of the mold cavity.

Referring to the drawing, the prior art tumbler 10 shown in FIG. 1, is conventionally made by injecting transparent polystyrene into a mold where the bottom 11 of the tumbler is located as indicated by a gate 12. The plastic material flows in the directions indicated by the arrows 13, from the bottom of the mold cavity and up the side wall until the mold cavity fills to form the rim 14. The cavity is generally vented at the parting line of the mold which typically occurs where the rim is formed.

The plastic material from which the tumbler is made, exhibits directional strength properties with it being stronger in the direction of mold filling movement but substantially weaker perpendicularly thereto. Thus, the prior art tumbler, when the side wall is squeezed adjacent the rim as done when being held in a hand, is susciptible to splitting from the rim down the side wall.

A section of a tumbler 20 of the present invention is shown in FIG. 2, has a bottom 21, a frusto-conical side wall 22 and a rim 23. The plastic material is injected at a plurality of spaced gates adjacent the rim so that it moves circularly in the rim and with a progressively decreasing swirling circular and lengthwise movement in the side walls as it fills the cavity with the movement being indicated by arrows 24. Though the polystyrene material maintains its same directional strength characteristics, the plastic flow by including a movement transverse to the axis of the tumbler, especially in the rim, creates a greater resistance to lengthwise fracturing or splitting when the tumbler is squeezed as the stronger directional strength extends peripherally about the rim.

Shown in FIG. 3 is a diametric cross-section of a separable mold 30 formed of a stationary part 31 and a movable part 32. The parts are shown somewhat separated but when clamped together, they form a mold cavity with the stationary part defining the exterior of the tumbler and the movable part defining the interior.

The upper surface 33 of the stationary part is formed with an annular runner 34 which communicates with a plurality of tunnel or submarine gates 35. The gates extend downwardly from the runner and also, as shown, are directed at an angle to be somewhat tangential to the mold cavity. Accordingly, plastic material forced into the runner 34 will move through the gates and into the mold cavity in the directions indicated by the arrows 24 in FIG. 2.

The stationary part 31 has formed therein adjacent the bottom forming portion of the mold, a cooling passageway 36 through which cooling water is forced to flow by a negative pressure cooling system 37. A porous plug 38 is positioned at the bottom of the stationary mold cavity to effect communication between the cavity and the passageway. The plug is located at the last portion of the cavity to be filled and enables gases within the cavity to be vented into the cooling passageway which is maintained at a less than atmospheric pressure. For a fuller description of venting into the cooling liquid passageway, reference is made to my U.S. Pat. No. 4,091,069, assigned to the assignee of the present invention. It should be noted, however, that other and different venting structures, such as vent pins, may be employed, if desired.

After the mold has been filled, the mold parts are separated and the tumbler is removed. The plastic in the tunnel gates 35 shears at the side wall of the tumbler, as indicated at 39 in FIG. 2 without forming unacceptable projections on the side wall and ejector pins 40 are moved to remove the plastic material in the runner 34 and the gates 35. Preferably, as shown, the pins 40 move somewhat transversely in order to rotate the plastic material in the runner 34 as it is being lifted off the stationary part to assure that plastic material in the gates 35 will remain integral, to be removed, therewith.

As the plastic material in the runner and gates may be reused, waste of plastic material is not increased by the present invention. Moreover, in view of the increased resistance to vertical splitting and with the location of the gates near the rim, the wall thickness of the side wall may be reduced from the heretofore known tumbler, thereby reducing the cost of manufacture thereof.

While eight evenly spaced gates 34 have been shown, the number of gates may vary therefrom as for example, 4 or 6, depending upon factors such as wall thickness and the complete filling of the bottom. It is, however, desirable to have the circular flow from one gate intersect the circular flow from the next gate at the rim before the plastic material extends very far down the side walls of the cavity. If desired, the peripheral edge of the bottom may be formed rounded, rather than with the sharp corner shown. The portion of the mold at the rim in this embodiment is vented through the parting lines of the two mold parts.

While in the previous embodiment, the gates have been shown adjacent the rim, it is also contemplated to have the gates be formed to inject the plastic material directly, through still somewhat tangentially, into the rim defining portion of the mold cavity. Thus, as shown in FIG. 5, the upper surface 33 of the stationary mold 31 is again formed with the annular runner 34. However, in this embodiment, each gate 40 extends directly from the runner to the rim defining portion of the mold cavity without having any downward direction. The gates 40 are, as in the prior embodiment, made to extend somewhat tangentially to the rim defining portion of the cavity to insure that the plastic material will move circularly or peripherally in the rim portion and decreasingly swirl in the side wall portion of the mold as the cavity is filled. With this location of the gates, the ejector pins need only move vertically to remove the material in the runner and gates and further, all venting occurs through the bottom defining portion of the cavity.

It will accordingly be understood that there has been disclosed a method and apparatus for forming a tumbler which is substantially more resistant to lengthwise fracturing or breakage than heretofore known similar tumblers. Though the same relatively inexpensive plastic material is employed, and though it maintains its directional strength characteristics, the filling of the mold cavity with a circular and swirling movement of the plastic material, causes the stronger directional strength of the plastic material to extend peripherally around the rim and diagonally around the tumbler side wall, thereby increasing the tumbler's resistance to vertical fracturing by squeezing during normal usage.

Variations and modifications may be made within the scope of the claims and portions of the improvements may be used without others.

I claim:

1. A method for molding a plastic container having a closed bottom, a circular wall extending upwardly therefrom and a top circular rim on said wall comprising the steps of forming a closed mold cavity defining the shape of said plastic container, injecting plastic material into said cavity in a common direction at a plurality of spaced points at least adjacent the rim-forming portion of the cavity and at an angle substantially tangential thereto to fill the rim-forming portion with a peripheral circular movement of said plastic material and cause said plastic material to swirl around and down into the side wall-forming portion of the cavity towards and into the bottom-forming portion of the cavity while evacuating at least some of the gas present in the cavity through the bottom-forming portion of the cavity, to form a plastic container having improved strength due to the plastic material in the rim and wall thereof having been introduced in a circular swirl pattern.

2. The invention as defined in claim 1 in which there is the step of cooling the mold by flowing a cooling liquid therein under a negative pressure and in which the step of evacuating the gases from the mold cavity includes directing at least some of the gases into the cooling liquid passageway.

3. The invention as defined in claim 1 in which the step of injecting further includes spacing the injecting points essentially evenly about the cavity and in which the direction of the injected plastic material is essentially the same for each injecting point.

4. The invention as defined in claim 3 in which the step of injecting injects the plastic material substantially tangentially directly into the rim forming portion of the cavity.

5. The invention as defined in claim 3 in which the step of injecting injects the plastic material substantially tangentially into the side wall forming portion of the cavity adjacent the rim forming portion with an inclination towards the bottom forming portion of the cavity.

* * * * *